July 21, 1942. L. W. EVANS 2,290,639

OVERVOLTAGE PROTECTOR

Filed Nov. 22, 1940

Inventor:
Lewis W. Evans,
by Harry E. Dunham
His Attorney.

Patented July 21, 1942

2,290,639

UNITED STATES PATENT OFFICE 2,290,639

OVERVOLTAGE PROTECTOR

Lewis W. Evans, Pittsfield, Mass., assignor to General Electric Company, a corporation of New York Application November 22, 1940, Serial No. 366,565

6 Claims. (Cl. 175—30)

The present invention relates to overvoltage protective devices and more particularly to such devices that are suitable for use in low voltage distribution circuits.

The protection of low voltage alternating current power circuits or secondary distribution services involves the same fundamental considerations which apply to protection of primary distribution systems. While the length and exposure of these low voltage power circuits are usually considerably less than that of primary power circuits, they are nevertheless subject to lightning voltages which may greatly exceed the insulation flashover or breakdown strength of the connected low voltage apparatus. Because secondary distribution lines are usually supported on pin type or rack insulators mounted on wooden poles or cross arms, the line to ground flashover level of the exposed circuit is many times greater than the insulation level of the connected apparatus. Hence, the relief of lightning voltages on such unprotected circuits will usually occur at or within the apparatus, frequently resulting in damage and service interruption that necessitate apparatus replacements and maintenance costs.

A lightning arrester for such service, therefore, should have a low impulse breakdown voltage to start the discharge, adequate discharge current capacity, and valve characteristics for preventing the flow of power current after discharge. It should be of a rugged design and yet compact enough that it may be installed directly at or closely adjacent the apparatus terminals. It is also important that the device be of such low cost that its installation is economically justified in view of the relatively low cost apparatus to be protected.

It is therefore a general object of the present invention to provide a new and improved overvoltage protector suitable for use in low voltage secondary distribution circuits.

It is a further object of the present invention to provide a reliable overvoltage protective device, particularly suitable for use in low voltage circuits, which is of a simple, compact design and of low cost manufacture.

Further objects and advantages of the invention will appear from the following description taken in connection with the accompanying drawing, while the features of novelty will be pointed out with greater particularity in the appended claims.

Figure 1:
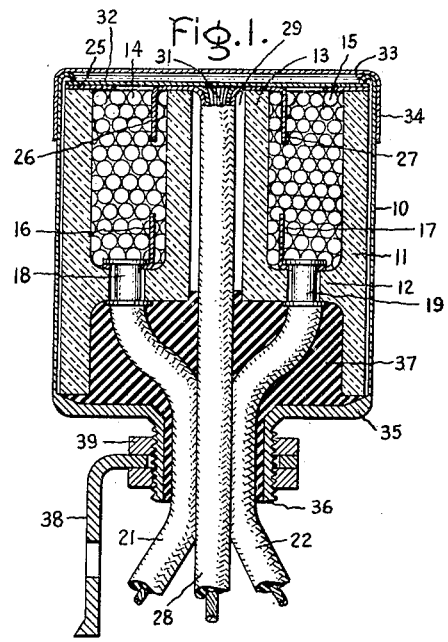
Figure 2:
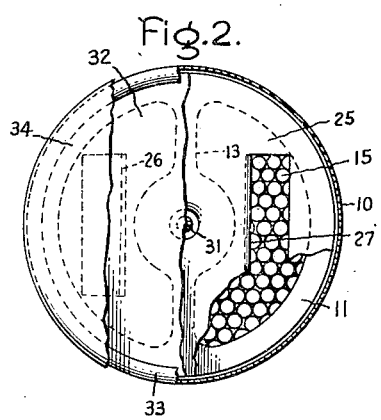

In the drawing Fig. 1 is a cross sectional view of an overvoltage protective device constructed in accordance with one form of the invention, and Fig. 2 is an end view of the device with the cover removed, partly in section, illustrating certain details thereof.

The protector to be described is of a two-pole type, that is, it includes two single-pole valve elements with two line leads and one ground lead as are required for typical 115/230 volt, single phase, three wire secondary services. It may, of course, be applied to a single phase, two wire circuit if desired.

The protective device comprises a metal housing 10 in the form of a cylindrical cup which, for example, may be of drawn aluminum. Arranged within the cup 10 is a cylindrical insulating body 11 which may be of a molded material such as porcelain, though it is to be understood that any other suitable insulating material may be utilized if desired. The cylindrical body 11 is provided between its ends with a radially extending wall 12 and the section above the wall, as viewed in Fig. 1, is further subdivided by means of an axially extending transverse wall 13 so as to provide two semicircular compartments for valve elements such as the pellets indicated at 14 and 15, respectively. These pellet valve elements are of a well-known type consisting essentially of lead peroxide, each pellet being coated with a layer of litharge. The lead peroxide has a very low resistance, but the pellets are insulated from each other by their coatings of litharge, so that the normal resistance of the column of pellets is very high under normal voltage conditions. If the voltage across the column of pellets becomes excessive, however, it will break down the litharge coatings at the contacts between the pellets and along a path through the column of pellets, so that the resistance of this path is low and a discharge through the column can take place freely. As soon as normal voltage conditions return, however, the lead peroxide at the contact points between the pellets changes back to litharge and the high resistance of the column of pellets is restored to limit the discharge current through the arrester. For a more complete description of the pellet valve elements reference is made to the Patent No. 1,723,872, issued August 6, 1929, to Norman A. Lougee, and assigned to the General Electric Company, the assignee of the present application.

Line electrodes 16 and 17 are secured in the lower ends of the valve compartments by means of eyelets 18 and 19, respectively, extending through cooperating openings in the wall 12. The ends of the line leads 21 and 22 are conductively connected to the electrodes 16 and 17, respectively, as by soldering of the lead ends into the corresponding eyelet openings. The upper ends of the two columns of valve elements are connected together by means of a metal disk 25 arranged over the upper end of the insulating body 11. Electrode portions 26 and 27 of the disk 25 are struck out and bent downwardly so as to extend into the corresponding columns of pellets to insure a good connection therewith. It will be understood that during handling and usage of the protective device the pellets themselves may settle somewhat and drop out of contact with the flat surface of the disk 25. The disk 25 with the struck out portions 26 and 27 constitutes the ground electrode and is conductively connected to the ground lead 28 which extends axially through the device as through the axial opening 29 provided in the wall 13 of the insulating body 11. A convenient method of securing the ground lead 28 to the disk 25 consists in soldering the lead conductor within a punched opening provided centrally in the disk 25 as indicated at 31. Over the disk 25 and closing the upper end of the device is arranged a second disk 32 of a diameter just slightly smaller than the inner diameter of the outer metal casing 10. The disks 25 and 32 are secured rigidly against the upper edges of the insulating body 11 by the rolled over upper edge of the metal cup 10 as indicated at 33.

The lower end wall 35 of the metal cup 10 is provided with an outwardly extending and axially arranged nipple 36 through which the various leads 21, 22, and 28 extend. To prevent the leakage of moisture into the interior of the device the space between the radial wall 12 of the insulating body and the end wall 35 of the metal cup 10 is filled with a suitable insulating compound as is indicated at 37. When mounted in the position shown, it may also be desirable to provide a drawn metal cover 34 over the upper end of the container 10 to prevent leakage of moisture under the rolled edge 33.

The outer surface of the nipple 36 may be threaded as indicated so that it may be mounted within a knock out opening of a service switch housing or other conduit means (not shown). As illustrated in Fig. 1, the protective device may be supported by means of a simple bracket 38 which is clamped onto the nipple 36 by means of a pair of oppositely disposed nuts 39.

When applied to a typical low voltage system such as a single phase, 115/230 volt, three wire, grounded neutral secondary circuit, the phase leads 21 and 22 are connected to the outside or phase wires of the secondary, and the protector ground lead 28 is connected to the grounded neutral conductor and also to ground. If applied to a single phase, two wire, secondary circuit with one side grounded, the two poles of the protector can be operated in parallel by connecting both protector phase leads 21 and 22 to the ungrounded conductor of the circuit and connecting the ground lead 28 to the grounded secondary conductor and to ground.

While the rating for the protective device may be varied as desired by properly dimensioning the cross section and length of the pellet columns, I have found that a device suitable for use with typical 115/230 volt secondary circuits may be provided by making the pellet columns approximately 1½ inches in length each and with a separation between the line and ground electrode approximately ¾ inch. Each column of pellets has a relatively large cross sectional area as regards its length such as of the order of one square inch and since the opposite end electrodes of each pellet column are in contact with the pellets over a relatively large area, adequate current carrying capacity during a discharge is assured. In the tests of a device constructed as described, it was found that the average impulse breakdown voltage to start discharge was about 1.6 kv. crest, and the IR drop was about 1.8 kv. crest attending 1500 ampere impulse discharge current. Since a representative figure for flashover or breakdown voltage of typical watthour meters or other 115-volt apparatus insulation is about 10 kv. crest, it is seen that the protector limits voltage stress to but a fraction of the insulation strength.

The protective device described is of a relatively small, compact design having a diameter of approximately 2½ while the length of the container is but slightly over 2½ inches. This device therefore occupies but little space and if desired may be mounted relatively closely adjacent the particular piece of apparatus that is to be protected. Since the device consists of a relatively few parts of a simple design, the manufacturing costs thereof are low so that its installation and use are economically justified for the protection of equipment in the average low voltage installation such as in residences and the like.

Having described my invention in what I consider to represent a preferred embodiment thereof, I desire to have it understood that the specific form shown is merely illustrative and that the invention may be carried out by other means.

What I claim as new and desire to secure by Letters Patent of the United States is:

1. An overvoltage protective device comprising a generally cylindrical insulating body having a radially extending wall therein and an axially extending transverse wall defining a pair of substantially semicircular compartments, pellet valve elements substantially filling said compartments, conducting means extending across one pair of adjacent ends of said compartments having portions extending into each in a contacting relation with the pellets therein, an axial opening through said insulating body and said transverse wall, a grounding lead extending through said axial opening and connected to said means, electrodes secured to said radially extending wall and having portions extending into corresponding of said compartments in a contacting relation with thet pellets therein, line leads connected to said last mentioned electrodes, an enclosing housing for said insulating body having a threaded nipple surrounding said leads for mounting said device.

2. An overvoltage protective device comprising a cylindrical insulating body having a radially extending wall therein and an axially extending transverse wall defining a pair of substantially semicircular compartments, said compartments being substantially filled with pellet valve elements, conductive means extending across one pair of adjacent ends of said compartments and having portions extending into each in a contacting relation with the pellets therein, a grounding lead connected to said means, and line electrodes secured to said radially extending wall and extending into said compartments in a contacting relation with the pellets therein, and line leads connected to said last mentioned electrodes.

3. An overvoltage protective device comprising a cylindrical insulating body having a radially extending wall therein and an axially extending transverse wall defining a pair of substantially semicircular compartments open at one end, valve elements arranged in said compartments, means closing the open ends of said compartments and connecting together adjacent ends of said valve elements, a grounding lead connected to said means, and line leads extending into said compartments from the ends opposite said open ends and connected to adjacent ends of said valve elements.

4. An overvoltage protective device comprising an insulating body having walls defining a pair of compartments open at least one end, valve elements arranged in said compartments, means arranged over the open ends of said compartments and having electrode portions contacting and connecting together corresponding ends of said valve elements, a grounding lead electrically associated with said electrode portions, line electrodes extending into said compartments and connected to corresponding ends of said valve elements opposite said first mentioned ends, line leads connected to said last mentioned electrodes, and a casing surrounding said insulating body and substantially covering the opposite ends thereof.

5. An overvoltage protective device comprising an insulating body having walls defining a pair of compartments, valve elements arranged in said compartments, means including electrodes extending into said compartments conductively connecting together a pair of corresponding ends of said valve elements, a grounding lead connected to said connecting means, and a pair of line leads connected to corresponding ends of said valve elements opposite said first mentioned ends.

6. An overvoltage protective device for a pair of electrical transmission lines comprising an insulating body having walls defining a pair of compartments, one of said walls defining an opening between said compartments, valve elements arranged in said compartments, electrodes for said valve elements, means connecting together corresponding electrodes of said valve elements, a grounding lead extending through said opening and connected to said means, and line leads connected to other electrodes of said valve elements.

LEWIS W. EVANS.